US012691509B2

(12) United States Patent
Venturini et al.

(10) Patent No.: US 12,691,509 B2
(45) Date of Patent: Jul. 28, 2026

(54) SIDE MILLING CUTTER

(71) Applicant: CERATIZIT AUSTRIA GESELLSCHAFT M.B.H., Reutte (AT)

(72) Inventors: Remus Venturini, Reutte (AT); Christian Göberl, Reutte (AT)

(73) Assignee: Ceratizit Austria Gesellschaft m.b.H., Reutte (AT)

( * ) Notice: Subject to any disclaimer, the term of this patent is extended or adjusted under 35 U.S.C. 154(b) by 459 days.

(21) Appl. No.: 18/264,945

(22) PCT Filed: Jan. 31, 2022

(86) PCT No.: PCT/EP2022/052178
§ 371 (c)(1),
(2) Date: Aug. 10, 2023

(87) PCT Pub. No.: WO2022/171471
PCT Pub. Date: Aug. 18, 2022

(65) Prior Publication Data
US 2024/0051042 A1     Feb. 15, 2024

(30) Foreign Application Priority Data
Feb. 10, 2021    (EP) ..................................... 21156179

(51) Int. Cl.
*B23C 5/08*          (2006.01)
*B23C 5/28*          (2006.01)
(52) U.S. Cl.
CPC ................ *B23C 5/08* (2013.01); *B23C 5/283* (2022.02); *B23C 2210/02* (2013.01); *B23C 2210/168* (2013.01)
(58) Field of Classification Search
CPC . B23C 2210/02; B23C 2210/168; B23C 5/08; B23C 5/283; B23C 5/28
See application file for complete search history.

(56) References Cited

U.S. PATENT DOCUMENTS 10,058,965 B2    8/2018  Haimer
11,407,044 B2    8/2022  Aso

FOREIGN PATENT DOCUMENTS

CN        102350528 A     2/2012
CN        104551161 A     4/2015
(Continued)

OTHER PUBLICATIONS

English translation of DE 102014211420 obtained from espacenet. com (Year: 2015).*

*Primary Examiner* — Moshe Wilensky
(74) *Attorney, Agent, or Firm* — Laurence A. Greenberg; Werner H. Stemer; Ralph E. Locher

(57)         ABSTRACT

A side milling cutter includes a main body extending along an axis from a first end with an interface for connection to a rotational drive to a free second end, receiving a bearing face for a disc-shaped cutter holder. The cutter holder is fastened to the second end and supported with a first main surface, facing the main body, on the bearing face, having an outer circumference projecting radially from the main body and a central through opening penetrating the cutter holder axially. Coolant feed channels feeding coolant to the second end are in the main body. Coolant distributing channels feeding coolant to the outer circumference of the cutter holder are in the cutter holder. At least two coolant distributing channels branch off from a common coolant distributing chamber between the main body and the cutter holder and into which at least two of the coolant feed channels open.

15 Claims, 10 Drawing Sheets

(56)  References Cited

FOREIGN PATENT DOCUMENTS

| CN | 107262797 | A | 10/2017 |
|----|-----------|-----|---------|
| DE | 102014211420 | B3 | 11/2015 |
| DE | 102014211407 | A1 | 12/2015 |
| DE | 202017105606 | U1 | 12/2018 |
| EP | 2929967 | A1 | 10/2015 |
| EP | 3153263 | A1 | 4/2017 |
| EP | 3321018 | A1 | 5/2018 |
| JP | 2016522755 | A | 8/2016 |
| JP | 6769530 | B1 | 10/2020 |

* cited by examiner

SIDE MILLING CUTTER

FIELD AND BACKGROUND OF THE INVENTION

The present invention relates to a side milling cutter with a main body which extends along a predefined rotational axis from a first end with an interface for connection to a rotational drive to a free second end, on which a bearing face for a disc-shaped cutter holder is configured, and a disc-shaped cutter holder which is fastened to the second end.

Side milling cutters are frequently used to configure grooves or slots in workpieces and to sever predominantly metallic materials, in the case of which side milling cutters a disc-shaped cutter holder is arranged on a main body which is configured for connection to a rotational drive, which cutter holder has a plurality of blades which are arranged distributed over the circumference of the disc-shaped cutter holder. Here, the blades can be formed, in particular, by way of cutting tool inserts which are held on corresponding seats of the cutter holder and are typically formed from a harder and more wear-resistant material than the main body and the disc-shaped cutter holder. For example, the main body and the disc-shaped cutter holder can be formed from tool steel, and the blades can be formed from carbide, cermet, ceramic or an ultra-hard material such as, for example, PCD (polycrystalline diamond) or CBN (cubic boron nitride).

19 DE 20 2017 105 606 U1 describes a side milling cutter with a main body and a disc-shaped cutter holder which is fastened to the former. A plurality of coolant feed channels are configured in the main body, which coolant feed channels each open in an end-side elongate coolant distributing chamber, via which coolant is transferred in each case into a plurality of inlet openings of the disc-shaped cutter holder.

SUMMARY OF THE INVENTION

It is an object of the invention to provide an improved side milling cutter, in the case of which the coolant feed to the blades is improved, and in the case of which the freedom of design in relation to the configuration of the disc-shaped cutter holder is increased.

If the terms axial, radial or tangential are used within the context of the following description, these specifications each relate to the rotational axis of the side milling cutter unless a different meaning results from the specific context.

The object is achieved by way of a side milling cutter according to the invention as claimed. Advantageous developments are specified in the dependent claims.

The side milling cutter has a main body which extends along the predefined rotational axis from a first end with an interface for connection to a rotational drive to a free second end, on which a bearing face for a disc-shaped cutter holder is configured, and a disc-shaped cutter holder which is fastened to the second end and is supported with a first main surface, facing the main body, on the bearing face, the outer circumference of which projects radially from the main body and which has a central through opening which penetrates the disc-shaped cutter holder axially. A plurality of coolant feed channels for feeding coolant to the second end of the main body are configured in the main body. A plurality of coolant distributing channels for feeding coolant to the outer circumference of the cutter holder are configured in the disc-shaped cutter holder. At least two of the plurality of coolant distributing channels branch off from a common coolant distributing chamber which is configured between the main body and the disc-shaped cutter holder and into which at least two of the plurality of coolant feed channels open.

Since the common coolant distributing chamber is provided, into which at least two coolant feed channels of the plurality of coolant feed channels open, coolant can be fed reliably to the outer circumference of the cutter holder even if a coolant feed channel should be clogged by way of contaminants, for example. Since the central through opening which penetrates the disc-shaped cutter holder axially is provided, the side milling cutter can be configured as what is known as a plug-on side milling cutter which, starting from the free second end, can be fastened by means of a central fastening screw to a rotational drive, to which the side milling cutter is coupled by way of the interface which is configured at its first end. It can preferably be provided that all the coolant feed channels of the plurality of coolant feed channels open into a common coolant distributing chamber, and that all the coolant distributing channels of the cutter holder branch off from a common coolant distributing chamber.

In accordance with one development, the common coolant distributing chamber extends in an annular manner around the rotational axis. In this case, a particularly homogeneous distribution of the coolant to all the coolant distributing channels is achieved.

In accordance with one development, the coolant distributing channels each have a first channel portion which runs in the interior of the cutter holder, is of closed configuration both on the side of the first main surface and on the side of a second main surface, lying opposite the first main surface, of the cutter holder, and has at least one outlet opening on the outer circumference of the cutter holder, and an inlet portion which is open towards the through opening and towards the first main surface, and extends only over a part of the thickness of the cutter holder in the region of the through opening. In this case, a relatively great cross section can be provided via the inlet portion in order to transfer coolant into the disc-like cutter holder, with the result that flow resistances can be kept low.

In accordance with one development, the coolant distributing channels each have a connecting portion which connects the inlet portion to the first channel portion, and is of closed configuration in the direction of the through opening and with respect to the second main surface. Since the connecting portion is provided, the axial height of the inlet portion which is open towards the through opening can be selected in such a way that it is only a relatively small part of the axial length of the through opening, and therefore the rest of the axial length of the through opening is available for sealing against undesired coolant escape.

If an axial height of the inlet portion which is open towards the through opening is at most one third of the thickness of the disc-shaped cutter holder at the through opening, sealing can be reliably provided with respect to undesired coolant escape via the remaining great proportion of the axial height of the through opening. The thickness of the cutter holder at the through opening can correspond, for example, to the thickness of the cutter holder in the region of seats for cutting tool inserts. If, in particular, the cutter holder is of stepped configuration in the region of the through opening, with the result that that region of the first main surface which is supported on the bearing surface is configured as a projection or as a depression, the thickness of the cutter holder at the through opening differs, however, from the thickness of the cutter holder at its outer circumference.

In accordance with one development, the coolant distributing chamber has a cutter holder-side portion which is formed by depressions in the disc-shaped cutter holder, which depressions adjoin the first main surface and the through opening and extend between the inlet portions of the respective coolant distributing channels. In this case, a homogeneous distribution of the coolant over the circumference of the cutter holder is achieved, and a great flow cross section for the inlet of the coolant into the coolant distributing channels can be provided overall.

If an axial height of the cutter holder-side portion of the coolant distributing chamber is at most one third of the thickness of the disc-shaped cutter holder at the through opening, sufficient remaining axial height of the through opening is available in those regions in the circumferential direction, in which the depressions of the cutter holder-side portion of the coolant distributing chamber are configured, in order to ensure reliable sealing with respect to undesired coolant escape. The axial height of the cutter holder-side portion of the coolant distributing chamber, that is to say the axial height of the depressions, can preferably correspond substantially to the axial height of the inlet portion, open towards the through opening, of the coolant distributing channels.

In accordance with one development, a centering pin which projects axially from the bearing surface is configured at the second end of the main body, and the through opening in the cutter holder is adapted to the outer contour of the centering pin. In this case, undesired coolant escape can be prevented reliably by way of interaction of the through opening with the outer contour of the centering pin.

In accordance with one development, a through bore which is open at the second end extends through the centering pin. In this case, the fastening of the side milling cutter to the rotational drive can take place in a simple way by way of access via the through bore starting from the second end. For example, an engagement into the through bore by way of a screwing tool can take place.

An inner circumferential surface of the through opening of the cutter holder preferably bears sealingly against an outer circumferential surface of the centering pin. In this case, undesired escape of coolant can be prevented reliably. The inner circumferential surface of the through opening and the outer circumferential surface of the centering pin can be honed, for example, in order to make a sealing fit possible. The outer circumferential surface of the centering pin and the inner circumferential surface of the through opening can preferably be of rotationally symmetrical configuration around the rotational axis. The outer circumferential surface of the centering pin and the inner circumferential surface of the through opening can be, for example, of conical configuration; the inner circumferential surface, however, can preferably be of hollow-cylindrical configuration and the outer circumferential surface can be of correspondingly cylindrical configuration, since this makes a particularly simple and inexpensive production possible.

In accordance with one development, the plurality of coolant feed channels open radially outside the centering pin into the common coolant distributing chamber. In this case, the common coolant distributing chamber can be configured particularly simply and inexpensively in such a way that flow resistances are minimized and that the coolant is distributed reliably and homogeneously over the entire circumference.

In accordance with one development, the coolant distributing chamber has a first main body-side portion which is formed by way of a groove which runs around the centering pin and is of deepened configuration with respect to the bearing surface. In this case, a sufficient cross section of the coolant distributing chamber can be provided in a particularly simple and inexpensive way, and a homogeneous distribution of the coolant is achieved over the entire circumference of the centering pin.

In accordance with one development, the coolant distributing chamber has a second main body-side portion which is formed by way of a circumferential recess which is made on the centering pin. In this case, the cross-section of the coolant distributing chamber can be enlarged in a particularly simple way, with the result that flow resistances can be kept low. The recess can preferably be configured in the region between the sealing outer circumferential surface of the centering pin and the bearing surface for the disc-shaped cutter holder.

In accordance with one development, the cutter holder has a plurality of seats distributed over the circumference of the disc-shaped cutter holder for receiving replaceable cutting tool inserts. In this case, the cutter holder can be manufactured inexpensively, for example from tool steel, and only the cutting tool inserts which have the blades which come into contact with the workpiece to be machined have to be formed from a particularly hard and wear-resistant material such as, for example, carbide (cemented carbide).

In accordance with one development, the seats are configured to receive replaceable cutting tool inserts in such a way that they each project axially on both sides from the disc-shaped cutter holder. In this case, relatively narrow slots can also be configured by way of the side milling cutter, and/or severing of material can take place with a relatively small slot width.

If the side milling cutter has a plurality of replaceable cutting tool inserts which are fastened to the seats and form that region of the side milling cutter which projects furthest axially from the main body, grooves can also, for example, be configured in a cavity very close to a bottom of the cavity.

BRIEF DESCRIPTION OF THE FIGURES

Further advantages and expediencies of the invention result on the basis of the following description of one exemplary embodiment, with reference to the appended figures.

DETAILED DESCRIPTION OF THE INVENTION

One embodiment of the side milling cutter will be described in greater detail in the following text with reference to FIG. 1 to FIG. 21.

In the case of the specific embodiment, the side milling cutter 100 is configured as what is known as a plug-on a side milling cutter for end-side mounting on a rotary drive of a machining tool.

Figure 4:
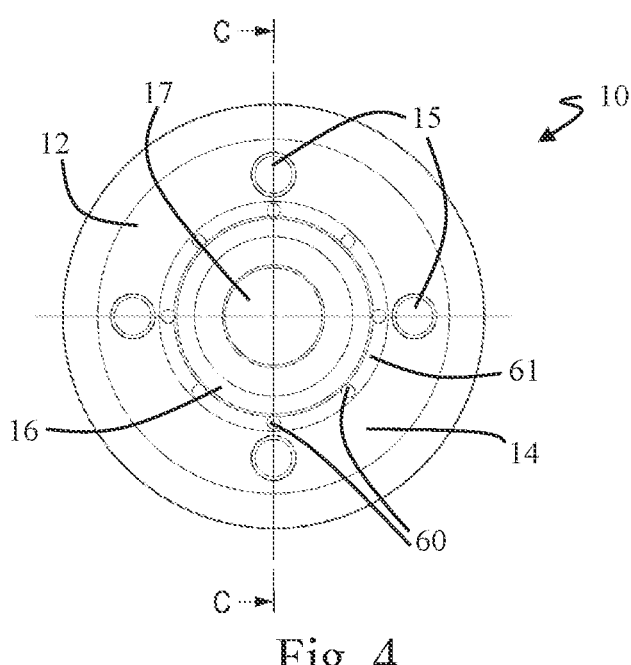
FIG. 4 shows a plan view of the free second end of the main body in the case of the embodiment.
Figure 5:
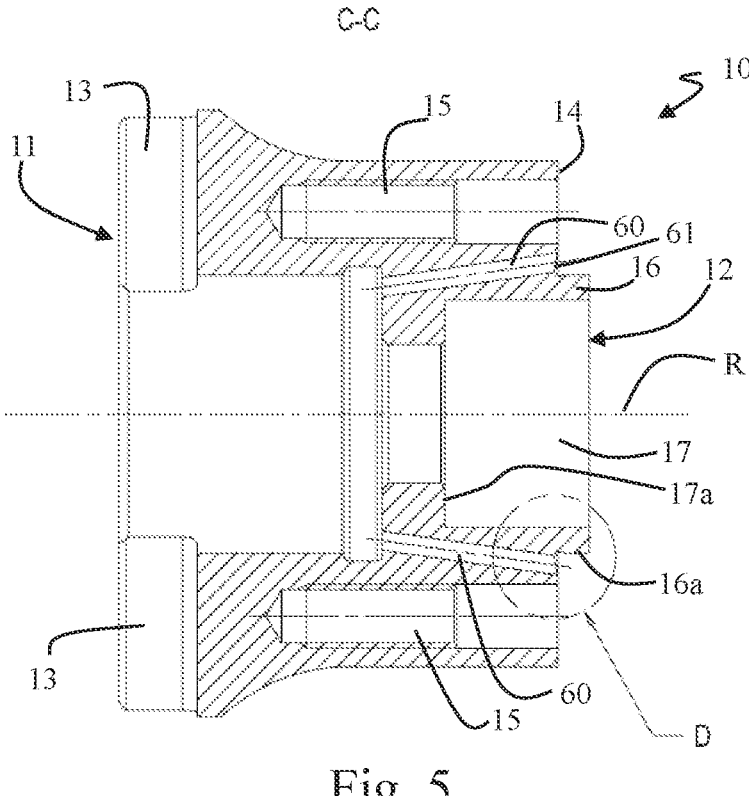
FIG. 5 shows an illustration of a section along the line C-C from FIG. 4.
Figure 6:
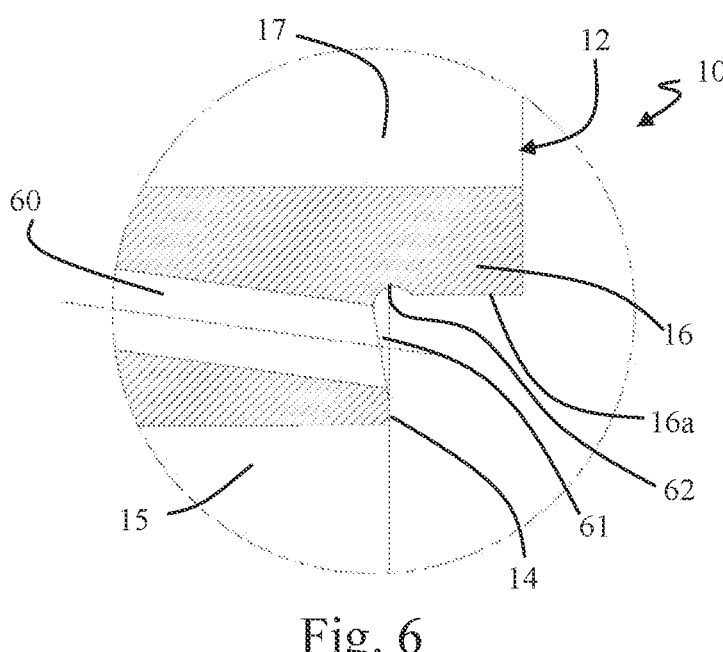
FIG. 6 shows an enlarged illustration of the detail D from FIG. 5.

The side milling cutter 100 has a main body 10 which is shown in greater detail, in particular, in FIG. 4, FIG. 5 and FIG. 6, and a disc-shaped cutter holder 20 which is shown in greater detail, in particular, in FIG. 7 to FIG. 10.

The main body 10 extends along the predefined rotational axis R from a first end 11 to a free second end 12, as can be seen in FIG. 5, in particular. An interface for connection to a rotational drive is configured at the first end 11. In the specifically shown exemplary embodiment, in particular, two recesses 13 are configured at the first end 11 for interaction with corresponding drivers on the rotational drive for the transmission of torque.

A bearing surface 14 for bearing against the disc-shaped cutter holder 20 is configured at the free second end 12 of the main body 10. In the case of the exemplary embodiment, the bearing surface 14 is formed by way of a planar end side of annular configuration of the main body 10, which end side extends in a plane perpendicularly with respect to the rotational axis R.

Starting from the second end 12 of the main body 10, a plurality of threaded bores 15 are provided in the bearing surface 14 for receiving fastening screws 30 for fastening the disc-shaped cutter holder 20 to the main body 10. Although a total of four threaded bores 15 of this type and four fastening screws 30 are provided in the case of the specifically shown embodiment, the number of fastening screws 30 and threaded bores 15 can also be less than four or greater than four.

Figure 3:
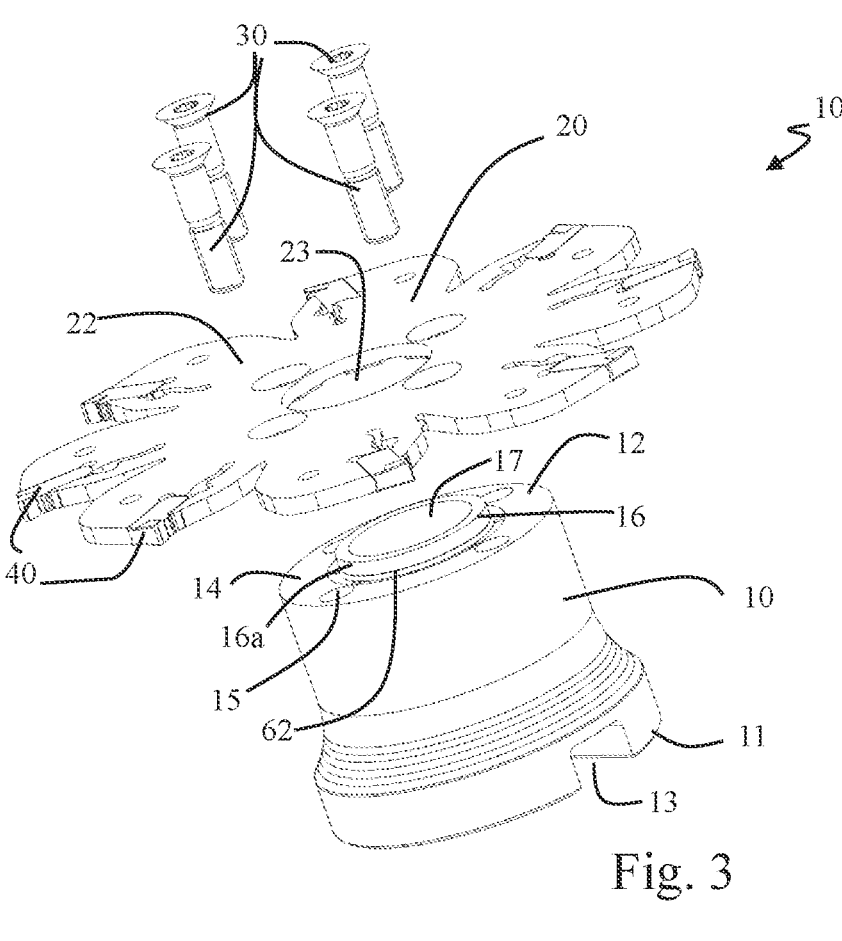
FIG. 3 shows a diagrammatic exploded illustration of the side milling cutter from FIG. 2.

A centering pin 16 which projects axially with respect to the bearing surface 14 is configured at the second end 12 of the main body 10, the function of which centering pin 16 is yet to be described in greater detail. As can be seen in FIG. 3 and FIG. 5, in particular, the centering pin 16 has a cylindrical outer circumferential surface 16a.

As can be seen in FIG. 5, in particular, a through bore 17 is configured in the main body 10, which through bore 17 extends along the rotational axis R from the second end 12 as far as the first end 11. Here, the through bore 17 also extends, in particular, through the centering pin 16, and is of open configuration at the second end 12. The through bore 17 is configured to receive a fastening means (not shown), by means of which the side milling cutter 100 can be fastened by way of its interface which is provided at the first end 11 to the rotational drive. The inner wall of the through bore 17 is, in particular, of stepped configuration and is provided with a shoulder 17a which extends substantially perpendicularly with respect to the rotational axis R and on which of the fastening means can be supported sealingly, in order to fasten the side milling cutter 100 to the rotational drive. Here, the operation of the fastening means can take place starting from the free second end 12 of the main body 10 or of the side milling cutter 100.

Figures 1, 2:
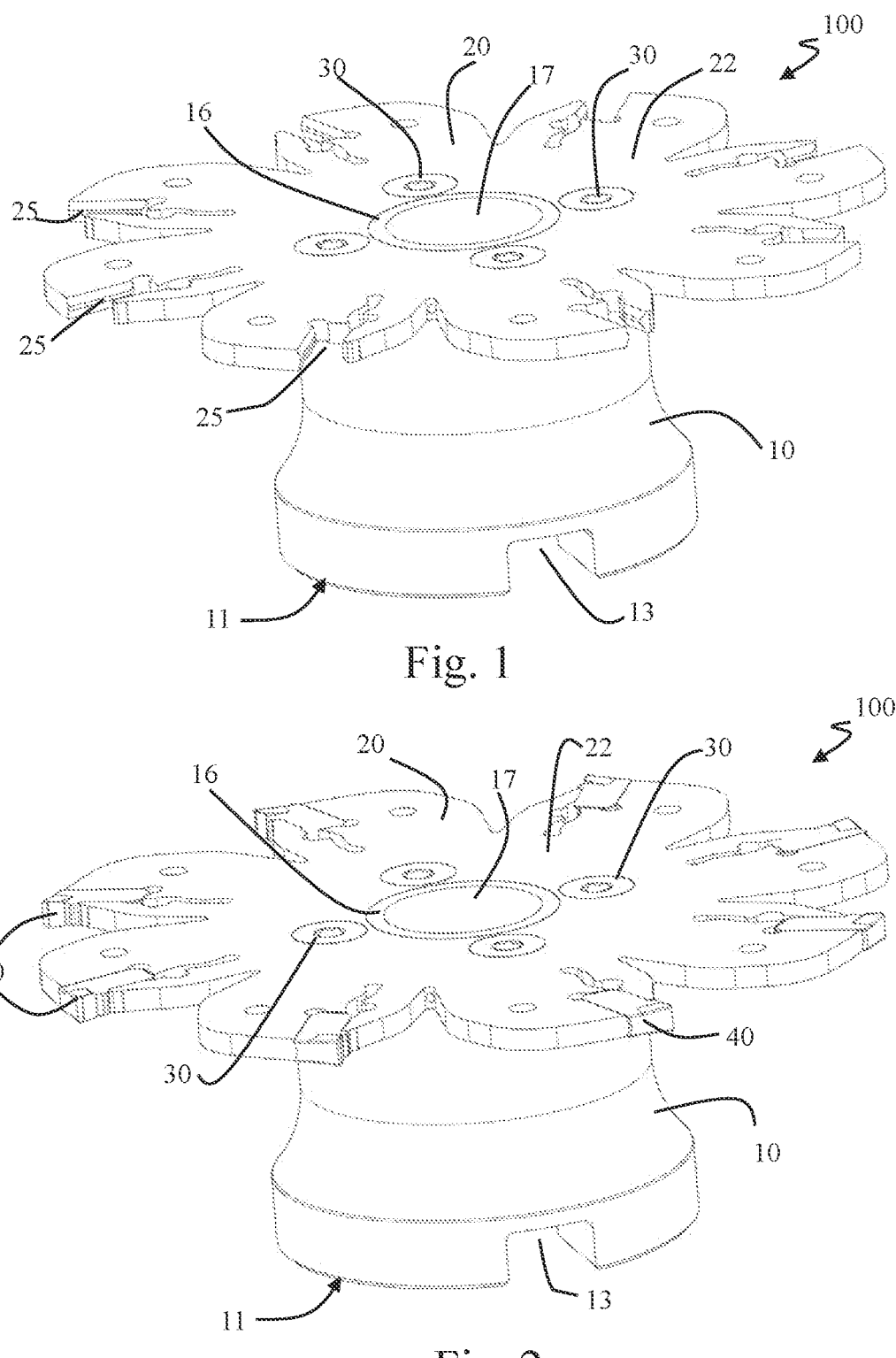
FIG. 1 shows a diagrammatic perspective illustration of a side milling cutter in accordance with one embodiment.
FIG. 2 shows a perspective illustration, corresponding to FIG. 1, of the side milling cutter with a plurality of replaceable cutting tool inserts which are fastened to respective seats.

In the following text, the disc-shaped cutter holder 20 will be described in greater detail. As can be seen in FIG. 1 to FIG. 3, FIG. 7 and FIG. 8, in particular, the disc-shaped cutter holder 20 has the form of a relatively thin disc with a first main surface 21 and a second main surface 22 which is parallel to the latter. In the assembled state of the side milling cutter 100, the first main surface 21 and the second main surface 22 each extend perpendicularly with respect to the rotational axis R. The first main surface 21 is configured, arranged so as to face the main body 10, to be supported by way of an annular region on the bearing surface 14. The annular region can, for example, preferably be of planar configuration with the rest of the first main surface 21. It is also possible, however, for the annular region to be of stepped configuration with respect to the rest of the first main surface 21, in particular as a projection, for example. The second main surface 22 is configured to be arranged so as to face away from the main body 10. The thickness of the disc-shaped cutter holder 20 and the axial height of the centering pin 16 are adapted to one another in such a way that, in the assembled state of the side milling cutter 100, the centering pin 16 does not project on the end side, but is rather substantially flush with the second main surface 22 of the cutter holder 20, as can be seen in FIG. 1 and FIG. 2, in particular.

Figure 7:
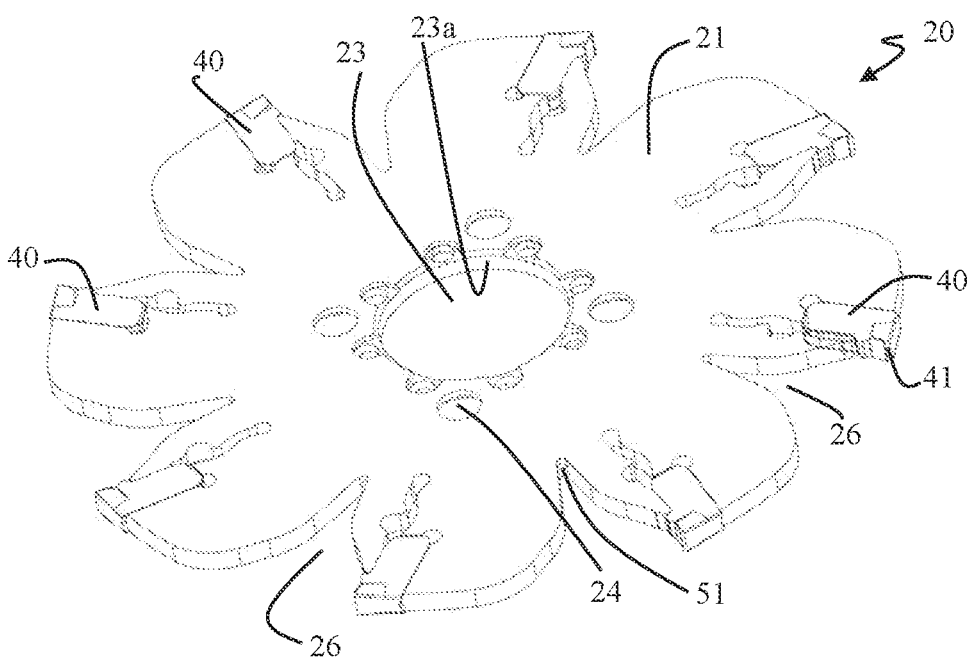
FIG. 7 shows a diagrammatic perspective view of the lower side of the disc-shaped cutter holder with cutting tool inserts which are arranged thereon.
Figure 8:
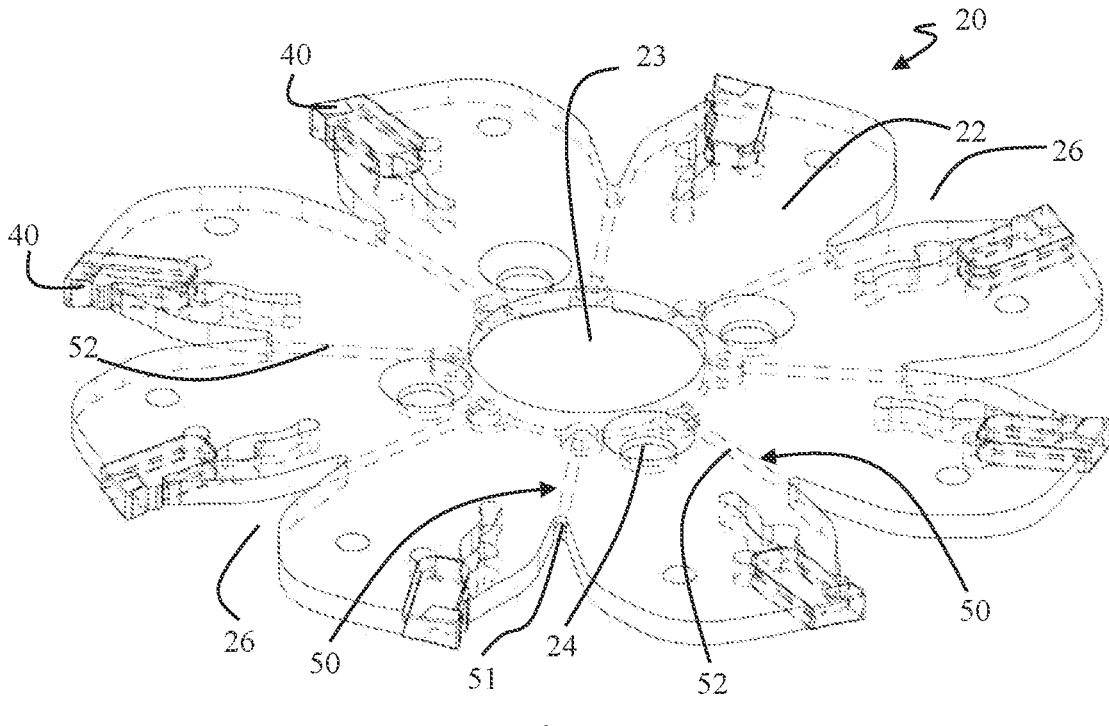
FIG. 8 shows a diagrammatic perspective illustration of the disc-shaped cutter holder with concealed lines which are shown using dashed lines.

As can be seen in FIG. 7 and FIG. 8, in particular, a through opening 23 which penetrates the cutter holder 20 from the second main surface 22 to the first main surface 21 is configured centrally in the cutter holder 20. The through opening 23 extends coaxially with respect to the rotational axis R, and has an inner circumferential surface 23a which is adapted with an accurate fit to the shape of the outer circumferential surface 16a of the centering pin 16. In the specifically shown exemplary embodiment, the inner circumferential surface 23a has a hollow-cylindrical shape. The inner circumferential surface 23a of the cutter holder 20 and the outer circumferential surface 16a of the centering pin 16 are adapted to one another in such a way that they bear sealingly against one another with respect to coolant, as is still to be described in greater detail in the following text.

Bores 24 for receiving the fastening screws 30 are configured in the cutter holder 20 radially outside the through opening 23, as can be seen in FIG. 7 and FIG. 8, in particular. As can be seen in FIG. 8, in particular, the bores 24 are of bevelled configuration in a manner which adjoins the second main surface 22, with the result that, in the mounted state which can be seen in FIG. 1 and FIG. 2, the heads of the fastening screws 30 do not project from the second main surface 22.

The cutter holder 20 projects radially from the main body 10 and has a substantially greater external diameter than the main body 10. A plurality of seats 25 for receiving replaceable cutting tool insert 40 are configured distributed over the outer circumference of the cutter holder 20, as can be seen in FIG. 1, in particular. Although the specifically shown exemplary embodiment shows a realisation, in the case of which a total of eight seats 25 with cutting tool inserts 40 arranged thereon are provided, fewer or more than eight seats 25 can also be provided, for example. Here, in particular, the number of seats can be varied, for example, in a manner which is dependent on the external diameter of the cutter holder 20. The seats 25 are configured in such a way that the cutting tool inserts 40 which are arranged thereon each project with a cutting edge 41 radially from the cutting holder 20.

Figure 12:
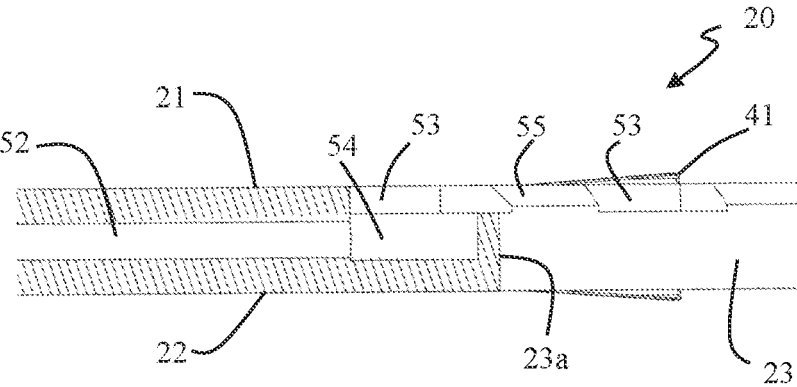
FIG. 12 shows a sectional illustration along the line D-D in FIG. 11.

In the case of the embodiment, the seats 25 are configured in such a way that the cutting edges 41 of the cutting tool inserts 40 each project axially on both sides from the cutter holder 20, that is to say project both axially beyond the second main surface 22 and axially beyond the first main surface 21, as can be seen in FIG. 12, in particular. Here, the width of the cutting edges in the axial direction is between 1.5 mm and 12 mm, preferably between 2 mm and 10 mm. The thickness of the cutting holder 20, that is to say the spacing between the first main surface 21 and the second main surface 22 is somewhat smaller (for example, in the range of tenths of a millimeter) than the width of the cutting edges, in order to ensure sufficient free movement.

In the case of the side milling cutter 100, the cutting edges 41 form those regions of the entire side milling cutter 100 which project furthest axially at the second end 22.

In the case of the specifically shown exemplary embodiment, the replaceable cutting tool inserts 40 are held on the seats 25 via clamping fingers which can be deflected elastically and are configured in the material of the cutter holder 20. Flutes 26 are each configured on the outer circumference of the cutter holder 20 adjacently with respect to the seats 25, as can be seen in FIG. 7 and FIG. 8, in particular.

The side milling cutter 100 in accordance with the embodiment has an internal coolant supply structure for targeted feeding of coolant into the region of the seats 25. The coolant supply structure is configured in such a way that coolant outlets are provided which are each assigned to the seats 25 and the cutting tool inserts 40 fastened to them. The configuration of the internal coolant supply structure will be described in greater detail in the following text.

First of all, the coolant distributing channels 50 which are configured in the disc-shaped cutter holder 20 will be described in greater detail with reference to FIG. 7 to FIG. 10.

A plurality of individual coolant distributing channels 50 are configured in the cutter holder 20. In the case of the embodiment, the number of coolant distributing channels 50 corresponds to the number of seats 25 for replaceable cutting tool inserts 40, with the result that each seat 25 is assigned an individual coolant distributing channel 50.

In the case of the specifically shown exemplary embodiment, each coolant distributing channel 50 has an outlet opening 51 on the outer circumference of the cutter holder 20, via which outlet opening 51 coolant which escapes therefrom can be fed into the region of a seat 25 or a cutting tool insert 40 which is arranged there. Although the specifically shown example shows a realisation, in the case of which the outlet openings 51 are each arranged in the region of the lowest point of the flute 26, other embodiments are also possible. For example, the outlet openings 51 can be arranged closer to the cutting surfaces of the respective cutting tool insert 40, or adjacently with respect to the open spaces of the respective cutting tool inserts 40. Although the coolant distributing channels 50 in the exemplary embodiment which is shown each have only one outlet opening 51, it can also be provided, for example, that the coolant distributing channels 50 branch and each have a plurality of outlet openings 51 such as, for example, an outlet opening which is directed in the direction of the cutting surface and an outlet opening which is directed in the direction of the open space.

The coolant distributing channels 50 in the cutter holder 20 each have a first channel portion 52 which runs towards the respective outlet opening 51 and runs in the interior of the cutter holder 20, as can be seen in FIG. 8, in particular. This first channel portion 52 runs in the interior of the cutter holder 20 in such a way that it is of closed configuration both on the side of the first main surface 21 and on the side of the opposite second main surface 22. The first channel portion 52 can preferably be configured at least substantially centrally between the first main surface 21 and the second main surface 22 of the cutter holder 20.

Figure 9:
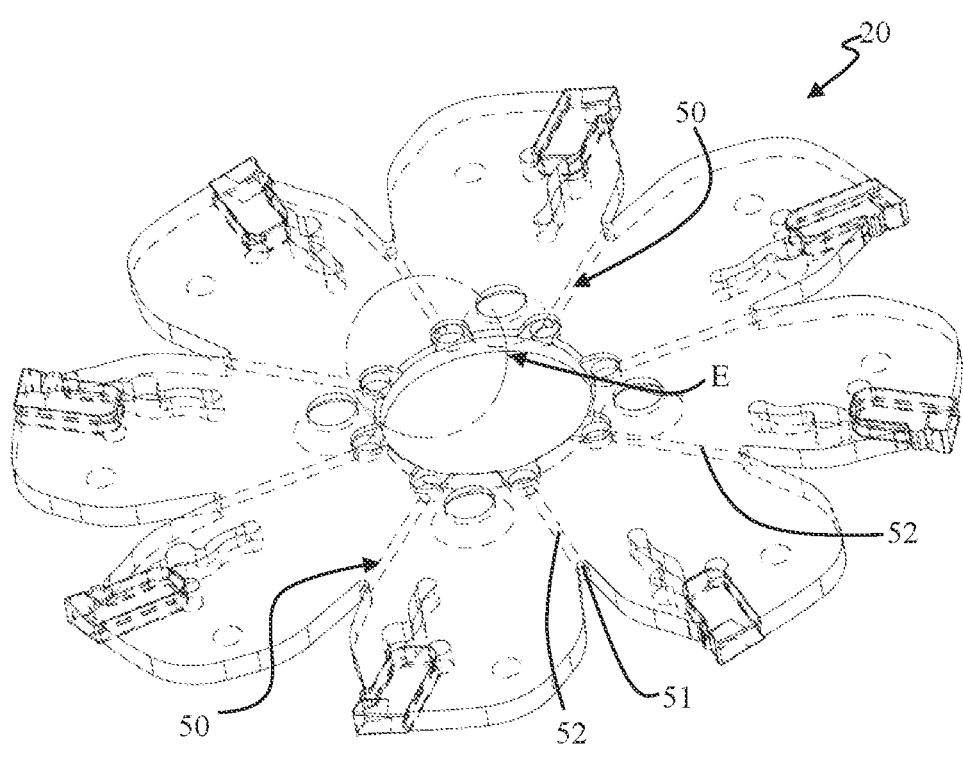
FIG. 9 shows a diagrammatic perspective view of the lower side of the cutter holder with concealed lines which are shown using dashed lines.
Figure 10:
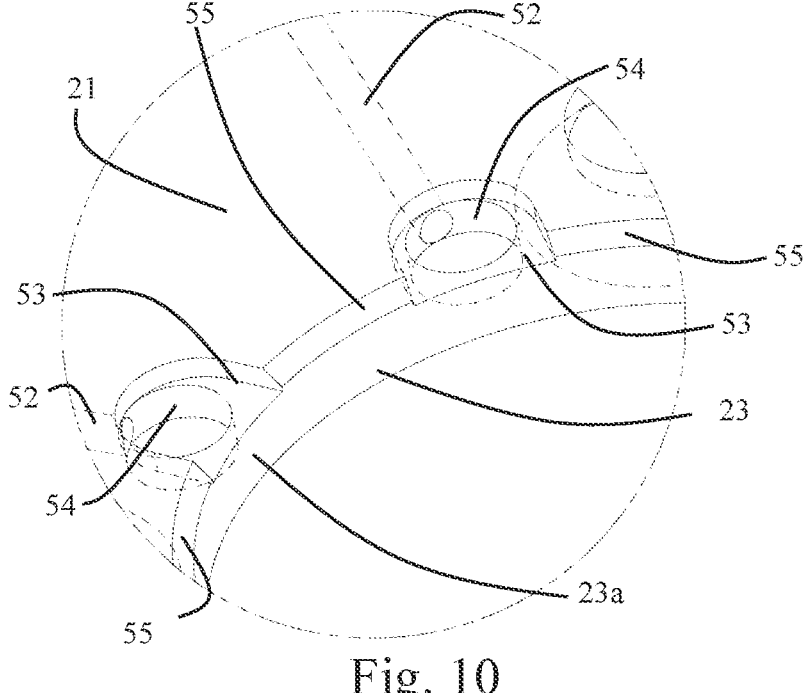
FIG. 10 shows an enlarged illustration of the detail E which is marked by a circle in FIG. 9.
Figure 11:
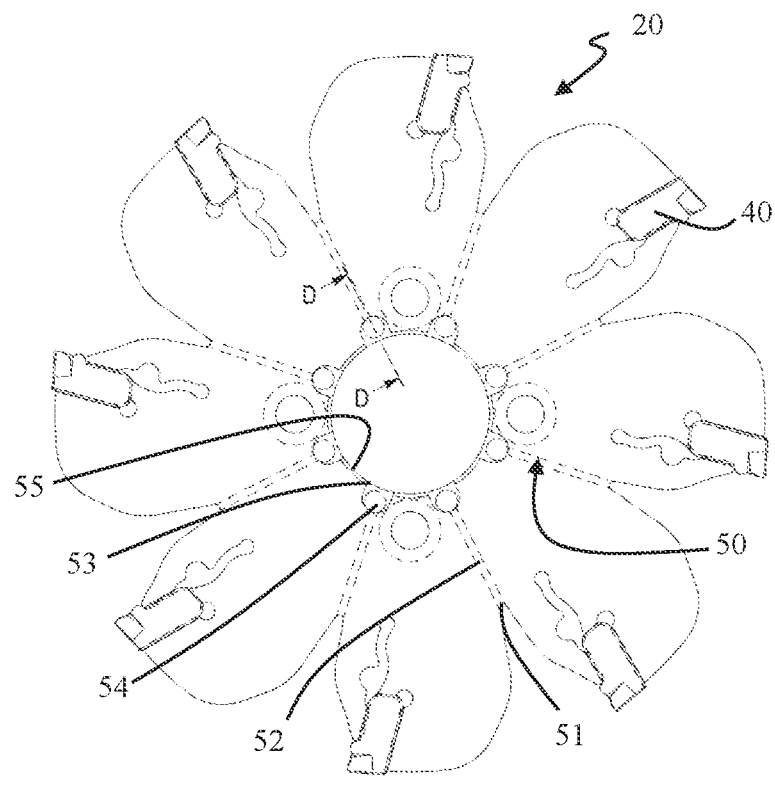
FIG. 11 shows a diagrammatic illustration of the cutter holder from below with concealed lines which are shown using dashed lines.

As can be seen from the detailed view in FIG. 10, in particular, which is an enlargement of the ringed detail E in FIG. 9, the coolant distributing channels 50 each have an inlet portion 53 in the radially inner region of the cutter holder 20, which inlet portion 53 is of open configuration with respect to the first main surface 21 and with respect to the through opening 23. Starting from the first main surface 21 of the cutter holder 20, the inlet portion 53 extends only over a part of the thickness of the cutter holder 20 in the region of the through opening 23; in particular, over at most one third of the thickness of the disc-shaped cutter holder 20 at the through opening 23. In other words, the axial height of the inlet portion 53 is at most one third of the thickness of the cutter holder 20 at the through opening 23. The inlet portion 53 can be configured, for example, by way of a milled-out portion starting from the first main surface 21 and starting from the through opening 23.

As can be seen in FIG. 10 and FIG. 12, in particular, the inlet portion 53 is connected via its connecting portion 54 to the first channel portion 52. The connecting portion 54 can be configured, for example, in particular by way of a transverse bore starting from the first main surface 21, which transverse bore connects the inlet portion 53 which is open towards the first main surface 21 to the first channel portion 52 which is situated further in the interior of the cutter holder 20. The connecting portion 54 is closed with respect to the second main surface 22 and in the direction of the through opening 23, with the result that the inner circumferential surface 23 which seals with respect to the outer circumferential surface 16a of the centering projection 16 extends in the region of the inlet portions 53 over at least two thirds of the thickness of the cutter holder 20 in the region of the through opening 23. These features can also be seen, in particular, in the sectional illustration of FIG. 12, a sectional illustration in the region of an inlet portion 53.

As can likewise be seen in FIG. 10 and FIG. 12, depressions 55 which adjoin the first main surface 21 and the through opening 23 are configured between adjacent inlet portions 53 of adjacent coolant distributing channels 50, the function of which depressions 55 will still be explained in greater detail. In the case of the embodiment, the depressions 55 are formed by way of a chamfer surface or bevel which in each case connects the adjacent inlet portions 53. In this way, the depressions 55 can be produced in a particularly simple way by way of configuration of a circumferential chamfer before or after the configuration of the inlet portions 53. In the thickness direction of the cutter holder 20, the depressions 55 also extend at most over one third of the thickness of the cutter holder 20 in the region of the through opening 23, with the result that the sealing inner circumferential surface 23a also extends in the region of the depressions 55 over at least two thirds of the thickness of the disc holder 20 there.

A plurality of coolant feed channels 60 are configured in the main body 10, the structure of which coolant feed channels 60 will be described in greater detail in the following text with reference to FIG. 4, FIG. 5 and FIG. 6. Although a total of eight coolant feed channels 60 of this type are shown in relation to the specifically shown exemplary embodiment, which corresponds to the number of coolant distributing channels 50 in the cutter holder 20, the number of coolant feed channels 60 can also be more or fewer than eight and, in particular, does not have to coincide with the number of coolant distributing channels 50 or the number of seats 25 on the cutter holder 20.

As can be seen in FIG. 5, in particular, the coolant feed channels 60 in the case of the shown exemplary embodiment branch off starting from the through bore 17, via which they are supplied with coolant starting from the side of the rotational drive. As can be seen in FIG. 4 and FIG. 5, in particular, the coolant feed channels 60 open radially outside the centering pin 16 and radially inside the position of the threaded bores 15 at the second end of the main body 10. Here, the orifices of the coolant feed channels 60 are arranged distributed in an annular manner over the outer circumference of the centering pin 16, that is to say the openings are arranged on a region which extends in an annular manner around the centering pin 16.

In the annular region, in which the coolant feed channels 60 open, the groove 61 of deepened configuration with respect to the bearing surface 14 is formed circumferentially around the centering pin 16, as can be seen in FIG. 4 and FIG. 6, in particular. In the case of the specifically shown exemplary embodiment, the groove 61 is configured as a hollow which deepens in the direction of the centering pin 16, that is to say radially inwards, on the bearing surface 14, which makes particularly simple production possible. Other shapes of the annularly circumferential groove 61 are also possible, however.

As can likewise be seen best in FIG. 6, a circumferential recess 62 is made on a centering pin 16 in the region between the outer circumferential surface 16a and the annular groove 61 which is configured in the bearing surface 14, with the result that the outer circumference of the centering pin 16 is reduced locally in this region. In other words, an annular depression is configured by way of this circumferential recess 62 on that region of the centering pin 16 which adjoins the bearing surface 14.

In the following text, the interaction of the main body 10 and the cutter holder 20 with configuration of an internal coolant supply structure will be described with reference to FIG. 13 to FIG. 21.

Figures 13, 14, 15:
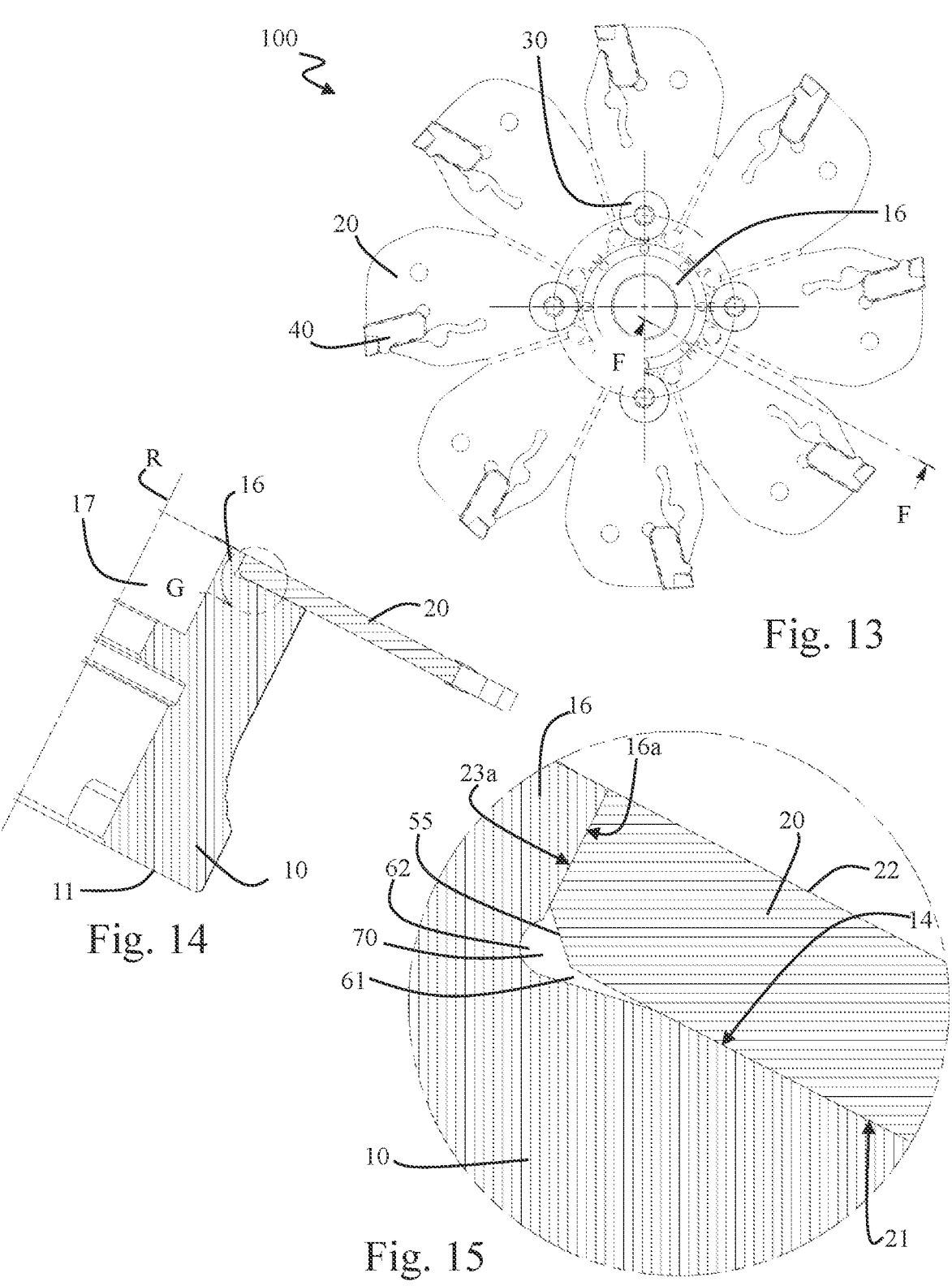
FIG. 13 shows a diagrammatic view of the side milling cutter with a view of the free second end with concealed lines which are shown using dashed lines.
FIG. 14 shows an illustration of a cut along the line F-F from FIG. 13.
FIG. 15 shows an enlarged illustration of a detail G which is ringed in FIG. 14.
Figures 16, 17, 18:
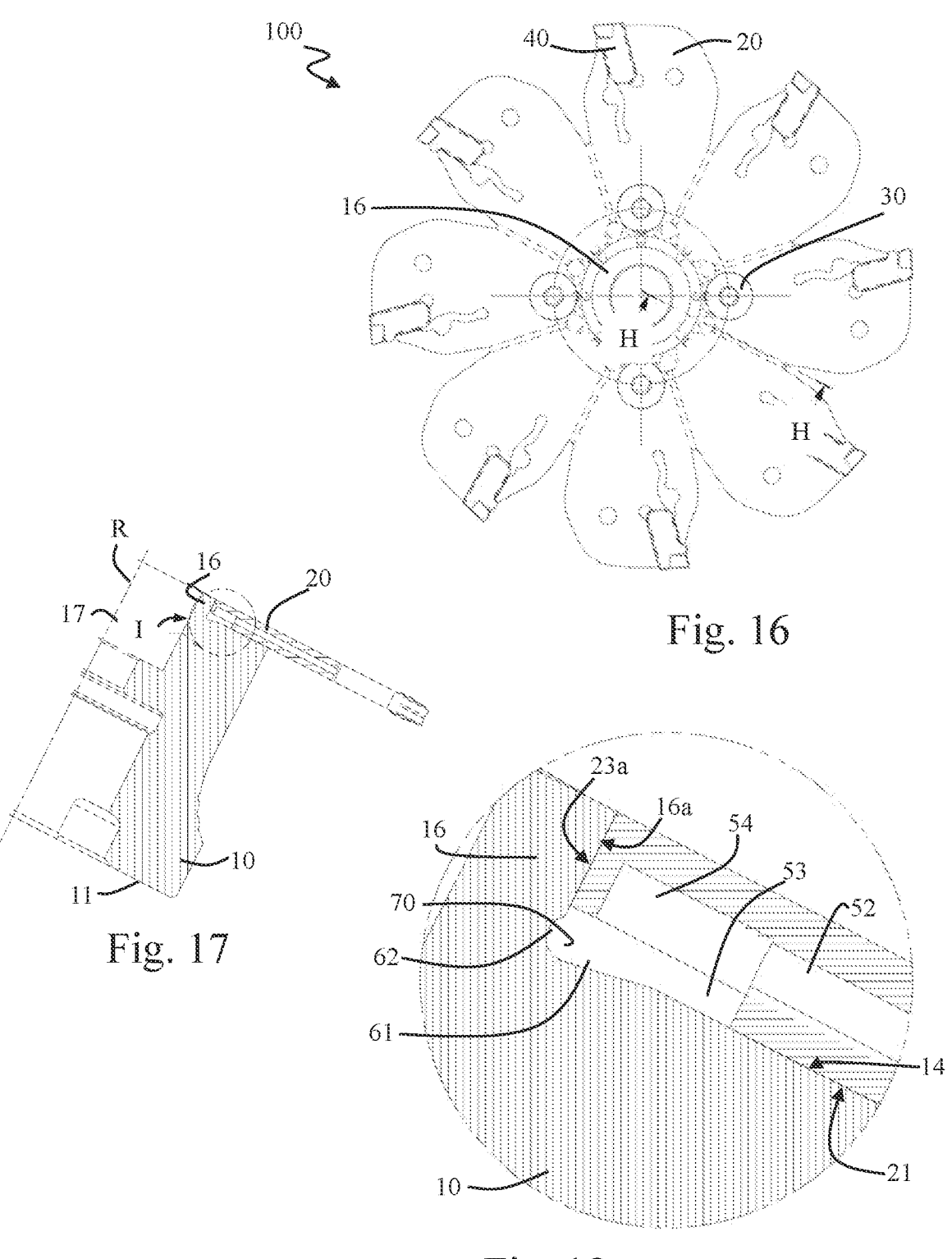
FIG. 16 shows a view which corresponds to FIG. 13.
FIG. 17 shows an illustration of a section along the line H-H from FIG. 16.
FIG. 18 shows an enlarged illustration of the detail I which is ringed in FIG. 17.
Figures 19, 20, 21:
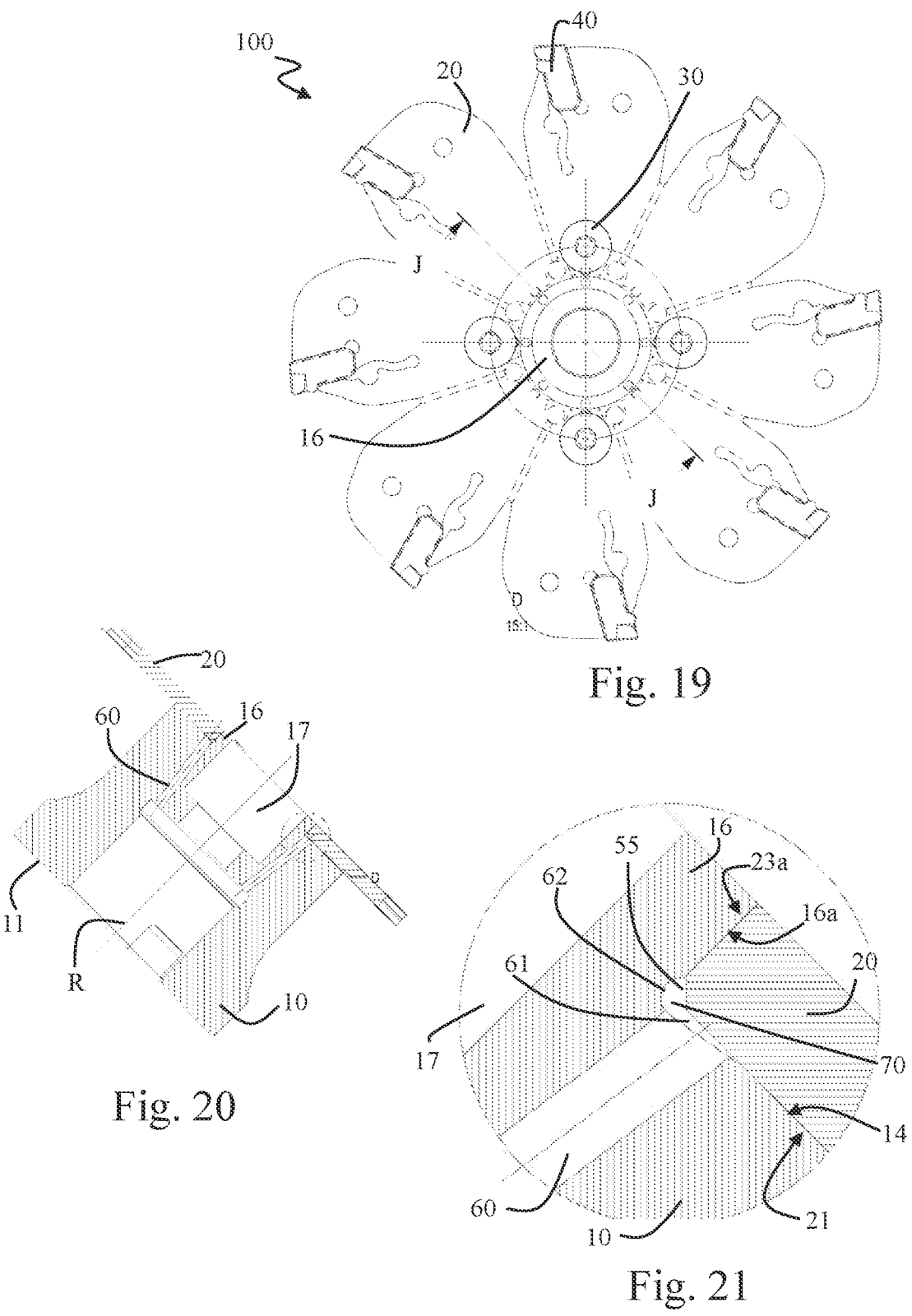
FIG. 19 shows an illustration which corresponds to FIG. 13.
FIG. 20 shows an illustration of a section along the line J-J from FIG. 19.
FIG. 21 shows an enlarged illustration of the detail which is ringed in FIG. 20.

When the cutter holder 20 is fastened to the main body 10, a region of the first main surface 21 of the cutter holder 20 bears against the bearing surface 14 of the main body 10, and the outer circumferential surface 16a of the centering pin 16 bears sealingly against the inner circumferential surface 23a of the through opening 23. As results from viewing the figures together, FIG. 15, FIG. 18 and FIG. 21 each show detailed illustrations of sections in planes which contain the rotational axis R, but at different points in the circumferential direction. FIG. 15 is a detail of a section in a region, in which neither coolant feed channel 60 opens nor an inlet portion 53 of coolant distributing channel 50 is situated. FIG. 18 shows a detail of a section in the region, in which an inlet portion 53 of coolant distributing channel 50 is situated. FIG. 21 is a detail of a section in a region, in which a coolant feed channel 60 opens.

As can be seen from viewing FIG. 15, FIG. 18 and FIG. 21 together, a coolant distributing chamber 70 is formed in the region between the main body 10 and the cutter holder 20. The coolant distributing chamber 70 is formed by way of the interaction of the annular groove 61 in the support surface 14, the circumferential recess 62 on the centering pin 16, and the depressions 55 on the cutter holder 20. This common coolant distributing channel 70 therefore extends in an annular manner around the rotational axis R or the centering pin 16. As a consequence, the common coolant distributing chamber 70 has a cutter holder-side portion which is formed by way of the depressions 55 on the cutter holder 20. The groove 61 which is of deepened configuration with respect to the bearing surface 14 forms a first main body-side portion of the common coolant distributing chamber 70. The circumferential recess 62 on the centering pin 16 forms a second main body-side portion of the common coolant distributing chamber 70.

As can be seen in FIG. 21, the coolant feed channels 60 each open into the common coolant distributing chamber 70 which is formed in this region by way of the recess 62, the groove 61 and the depression 55. As can be seen in FIG. 15, the coolant can then be distributed in the circumferential direction via the coolant distributing chamber 70. In the region, in which the inlet portions 53 of the respective coolant distributing channels 50 are situated, the coolant can then enter from the common coolant distributing chamber 70 into the respective coolant distributing channels 50, as can be seen in FIG. 18.

During operation of the side milling cutter 100, coolant is fed from the first end 11 of the main body 10 via the through bore 17 to the coolant feed channels 60. An axial end-side exit of the coolant at the second end 12 via the through bore 17 is prevented via the fastening means (not shown) received therein for the main body on the rotational drive. Via the coolant feed channels 60, the coolant is fed to the common coolant distributing chamber 70 and, via the latter, is distributed in the circumferential direction to the respective coolant distributing channels 50. An end-side exit of coolant at the second end 12 between the centering pin 16 and the through opening 23 is prevented by the fact that the inner circumferential surface 23a of the through opening 23 bears sealingly against the corresponding outer circumferential surface 16a of the centering pin 16. Via the coolant distributing channels 50 in the cutter holder 20, the coolant is fed in a targeted manner into the region of the respective seats 25.

On account of the annular configuration of the common coolant distributing chamber 70 and by virtue of the fact that it is situated radially inside the threaded bores 15 and fastening screws 30, the distribution of the inlet portions 53 of the coolant distributing channels 50 over the circumference of the through opening 23 is independent of the number and the distribution of orifices of the coolant feed channels 60 over the circumference of the centering pin 16. In this way, different cutter holders 20 can be used on the same main body 10, which cutter holders 20 differ from one another, for example, in terms of their external diameter and/or the number of pins 25 and coolant distributing channels 50.

Figure 22:
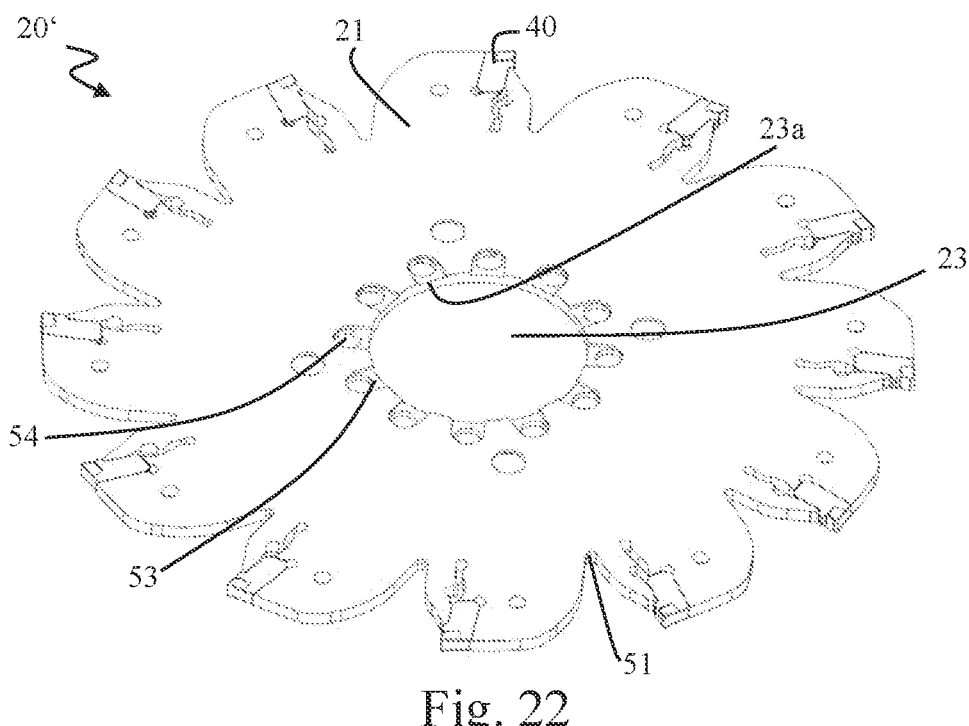
FIG. 22 shows a diagrammatic perspective illustration of a disc-shaped cutter holder in accordance with one modification.
Figure 23:
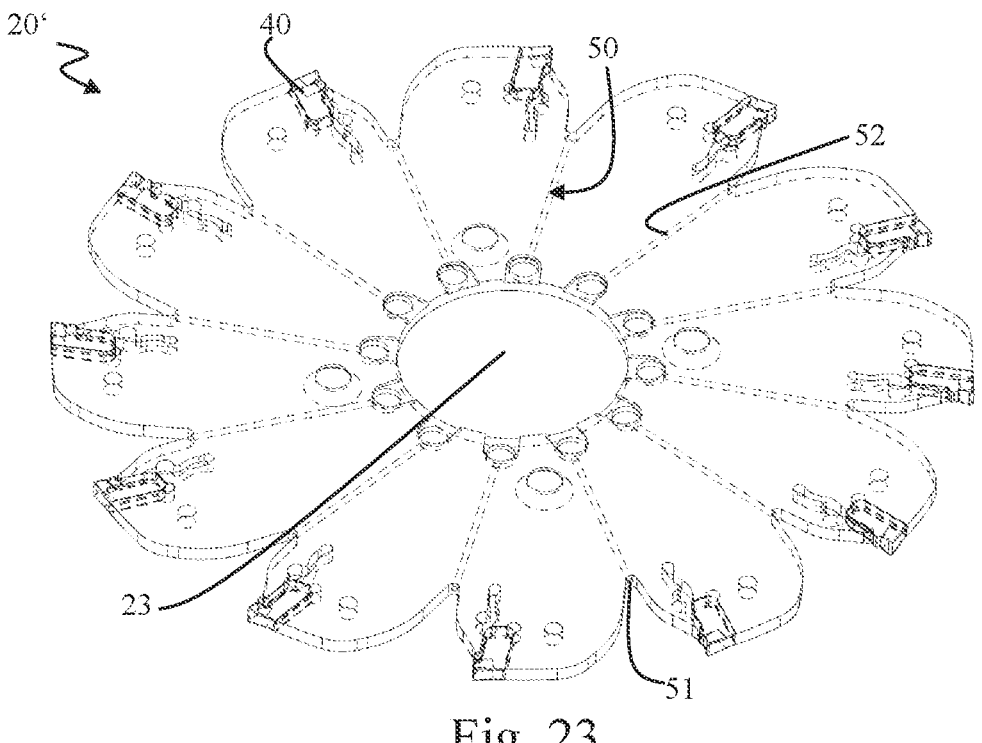
FIG. 23 shows a diagrammatic perspective illustration of the disc-shaped cutter holder in accordance with the modification with concealed lines which are shown using dashed lines.

FIG. 22 and FIG. 23 show one embodiment of the cutter holder which can likewise be used on the above-described main body 10.

As can be seen from FIG. 22 and FIG. 23, the cutter holder 20' in accordance with a modification differs from the above-described cutter holder 20 in that it has a greater number of seats 25 with cutting tool inserts 40 fastened thereto and correspondingly a greater number of coolant distributing channels 50. Since the cutter holder 20' otherwise does not differ from the above-described cutter holder 20, the same reference numerals are used and a detailed description of the individual features of the cutter holder is not repeated.

On account of the annular configuration of the common coolant distributing chamber 70, the cutter holder 20' according to the modification can be readily used on the main body 10, such that the cutting tool inserts 40 are supplied reliably with coolant.

Although one embodiment has been described, in the case of which the common coolant distributing chamber 70 has both the cutter holder-side portion (depressions 55) and the first main body-side portion (groove 61) and the second main body-side portion (recess 62), which makes particularly satisfactory coolant distribution and at the same time simple production possible, it is also possible, for example, for only one of these portions or only two of these portions to be provided. The coolant can also be distributed over the circumference in this case.

The invention claimed is:

1. A side milling cutter, comprising:
a main body extending along a predefined rotational axis from a first end having an interface for connection to a rotational drive to a free second end having a bearing face;
a disc-shaped cutter holder fastened to said second end and having a first main surface facing said main body and being supported on said bearing face, said disc-shaped cutter holder having a second main surface lying opposite said first main surface, said disc-shaped cutter holder having an outer circumference projecting radially from said main body, and said disc-shaped cutter holder having a central through opening penetrating said disc-shaped cutter holder axially;
a plurality of coolant feed channels configured in said main body for feeding coolant to said second end of said main body;
a plurality of coolant distributing channels configured in said disc-shaped cutter holder for feeding coolant to said outer circumference of said disc-shaped cutter holder, said coolant distributing channels having a closed configuration toward said first main surface and toward said second main surface, and said coolant distributing channels each having:

a first channel portion running in an interior of said disc-shaped cutter holder,
at least one outlet opening on said outer circumference of said disc- shaped cutter holder, and
an inlet portion being open towards said through opening and towards said first main surface and extending only over a part of a thickness of said disc-shaped cutter holder in a region of said through opening; and
a common coolant distributing chamber configured between said main body and said disc-shaped cutter holder, at least two of said plurality of coolant distributing channels branching off from said common coolant distributing chamber, and at least two of said plurality of coolant feed channels opening into said common coolant distributing chamber.

2. The side milling cutter according to claim 1, wherein said common coolant distributing chamber extends annularly around said rotational axis.

3. The side milling cutter according to claim 1, wherein said coolant distributing channels each having a connecting portion connecting said inlet portion to said first channel portion, said connecting portion having a closed configuration in a direction toward said through opening and relative to said second main surface.

4. The side milling cutter according to claim 1, wherein said inlet portion, being open towards said through opening, has an axial height being at most equal to one-third of said thickness of said disc-shaped cutter holder at said through opening.

5. The side milling cutter according to claim 1, wherein said coolant distributing chamber has a cutter holder-side portion formed by depressions in said disc-shaped cutter holder, said depressions adjoining said first main surface and said through opening and extending between said inlet portions of respective said coolant distributing channels.

6. The side milling cutter according to claim 5, wherein said cutter holder-side portion of said coolant distributing chamber has an axial height being equal to at most one-third of said thickness of said disc-shaped cutter holder at said through opening.

7. The side milling cutter according to claim 1, which further comprises a centering pin projecting axially from said bearing surface at said second end of said main body, said centering pin having an outer contour, and said through opening in said disc-shaped cutter holder being adapted to said outer contour of said centering pin.

8. The side milling cutter according to claim 7, wherein said centering pin has a through bore extending through said centering pin and being open at said second end.

9. The side milling cutter according to claim 7, wherein said centering pin has an outer circumferential surface, and said through opening of said disc-shaped cutter holder has an inner circumferential surface bearing sealingly against said outer circumferential surface of said centering pin.

10. The side milling cutter according to claim 7, wherein said plurality of coolant feed channels open radially outside said centering pin into said common coolant distributing chamber.

11. The side milling cutter according to claim 7, wherein said coolant distributing chamber has a first main body-side portion formed by a groove running around said centering pin and having a deepened configuration relative to said bearing surface.

12. The side milling cutter according to claim 11, wherein said coolant distributing chamber has a second main body-side portion formed by a circumferential recess formed on said centering pin.

13. The side milling cutter according to claim 1, which further comprises replaceable cutting tool inserts, said disc-shaped cutter holder having a plurality of seats distributed over said circumference of said disc- shaped cutter holder being configured for receiving said replaceable cutting tool inserts.

14. The side milling cutter according to claim 13, wherein said seats configured to receive said replaceable cutting tool inserts cause said replaceable cutting tool inserts to each project axially on both sides from said disc-shaped cutter holder.

15. The side milling cutter according to claim 13, wherein said plurality of replaceable cutting tool inserts are fastened to said seats and form a region of the side milling cutter projecting furthest axially from said main body.

* * * * *